US007591424B2

(12) United States Patent
Wang et al.

(10) Patent No.: US 7,591,424 B2
(45) Date of Patent: Sep. 22, 2009

(54) FRAMEWORK FOR ADDING BILLING PAYMENT TYPES

(75) Inventors: Xingheng Wang, Bellevue, WA (US); Mahesh Jayaram, Redmond, WA (US); Rajesh Kuppuswamy, Kirkland, WA (US); Stuart H. Marshall, Seattle, WA (US); Yunkai Zhou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/394,993

(22) Filed: Mar. 30, 2006

(65) Prior Publication Data

US 2007/0233573 A1  Oct. 4, 2007

(51) Int. Cl.
*G06K 15/00* (2006.01)
(52) U.S. Cl. .......................... 235/383; 235/385; 705/26
(58) Field of Classification Search ................. 235/383, 235/376, 385; 705/26, 10
See application file for complete search history.

(56) References Cited

U.S. PATENT DOCUMENTS

| 7,013,289 | B2 * | 3/2006 | Horn et al. ..................... 705/26 |
| 7,103,575 | B1 * | 9/2006 | Linehan ....................... 705/64 |
| 2002/0004780 | A1 * | 1/2002 | Mizuta ......................... 705/39 |
| 2002/0019781 | A1 * | 2/2002 | Shooks et al. ................. 705/26 |

* cited by examiner

*Primary Examiner*—Seung H Lee
(74) *Attorney, Agent, or Firm*—Capitol City TechLaw; Richard C. Irving (57) ABSTRACT

Various technologies and techniques are disclosed that improve an ecommerce payment process. The system receives a selection from a user to perform a checkout operation for items in a shopping cart. The system receives a payment type selection from a user and creates an encrypted packet of order information. The user is redirected to a URL of a third party payment processing system that supports the selected payment type for the user's country. The encrypted information is posted securely to the payment system and includes details standard across payment types. A user interface theme identifier is included to allow the third party system to provide a consistent user interface. The third party system accepts the standard details in the encrypted packet and implements the payment type specific details. The ecommerce system receives notification that the payment process succeeded and provisioning resumes by providing the purchased items to the user.

13 Claims, 11 Drawing Sheets

FRAMEWORK FOR ADDING BILLING PAYMENT TYPES

BACKGROUND

The convenience of shopping online has turned the business of ecommerce into a multi-billion dollar industry. Today's consumers typically purchase items regularly over the Internet to save the hassle of going to the store, to order the item at a lower price, or purchase an item they otherwise could not locate at their local store. It is quite common for an ecommerce site to have a global presence and offer products and/or services to consumers in multiple countries. Payment processing services can be used by an ecommerce site to enable this global presence that was previously impossible. In fact, by using these payment processing services, anyone can sell pretty much anything online and have a third party collect payment for the item.

As these successes of online shopping have increased, so have the complexities in dealing with these payment processing systems. The payment process has become problematic for various reasons. First, is extremely tedious to add new payment types because of the different regulations and procedures involved in each payment type. Even the same payment type must be handled differently in many different countries. Examples of payment types include Visa, Mastercard, PayPal, etc. Second, different payment types require different user interface flows with failure scenarios, and so on. The user is provided with a different user interface depending on what type of third party payment processing system is used. Third, each payment provider implements their own set of requirements for communicating with them. If you want your ecommerce site to integrate with multiple payment processing systems, you must write custom code to integrate with each of these systems and follow the specific communication and other requirements they may have. The end result of these problems is that it is not uncommon for it to take several months just to add just one new payment type to an existing ecommerce system.

SUMMARY

Various technologies and techniques are disclosed that improve an ecommerce payment process. The system receives a selection from a user to perform a checkout operation for one or more items in a shopping cart. The system receives a payment type selection from a user and creates an encrypted packet of order information. The user is redirected to a URL of a third party payment processing system that supports the selected payment type for the user's country. The encrypted information is posted securely to the payment system and includes details that are standard across payment types. A user interface theme identifier is included to allow the third party system to provide a consistent user interface. The user's prior order information can be provided to the payment system to allow the payment system to auto-complete part of the payment details.

The third party system accepts the standard details in the encrypted packet and implements the payment type specific details. The ecommerce system receives notification that the payment process succeeded and the provisioning process resumes by providing the purchased items to the user. A resume and restart process allows a user to resume a prior transaction that failed during the payment process or cancel and start a new transaction.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a process flow diagram for one implementation of the system of FIG. 1 illustrating the stages involved in providing a standardized application program interface that payment vendors comply with.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that improves an online payment process, but the system also serves other purposes in addition to these. In one implementation, one or more of the techniques described herein can be implemented as features within an ecommerce application, or from any other type of program or service allows a user to purchase a product and/or service and that uses a third party payment processing service. In another implementation, one or more of the techniques described herein are implemented as features with other applications that deal with payment processing systems in general.

Figure 1:
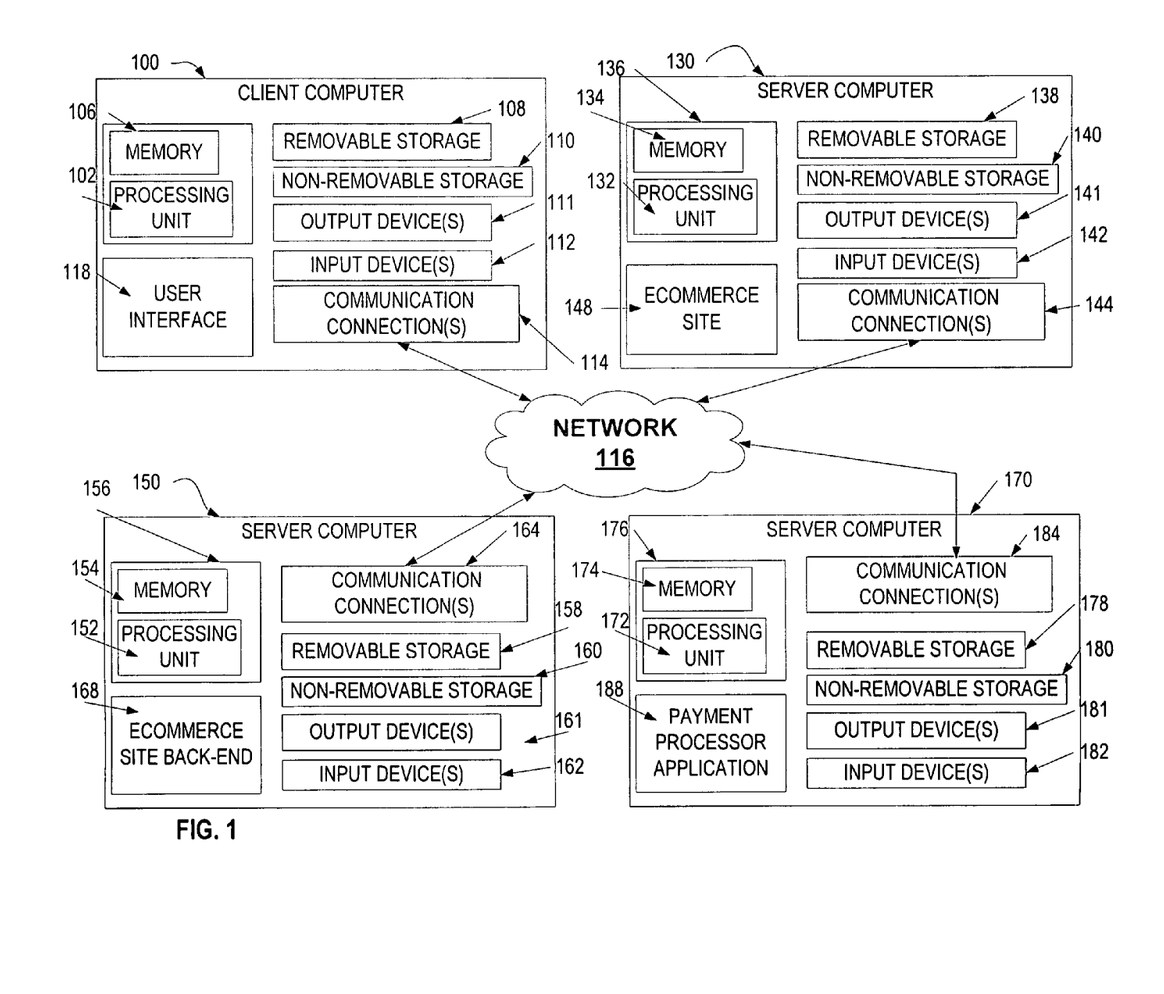
FIG. 1 is a diagrammatic view of a computer system of one implementation.

As shown in FIG. 1, an exemplary computer system to use for implementing one or more parts of the system includes one or more computing devices, such as computing devices 100, 130, 150, and/or 170. In its most basic configuration, computing devices 100, 130, 150, and/or 170 typically include at least one processing unit (102, 132, 152, and 172, respectively) and memory (104, 134, 154, and 174, respectively). Depending on the exact configuration and type of computing device, memory (104, 134, 154, or 174) may be volatile (such as RAM), non-volatile (such as ROM, flash memory, etc.) or some combination of the two. This most basic configuration is illustrated in FIG. 1 by lines 106, 136, 156, and 176.

Additionally, devices 100, 130, 150, and/or 170 may also have additional features/functionality. For example, devices 100, 130, 150, and/or 170 may also include additional storage (removable and/or non-removable) including, but not limited to, magnetic or optical disks or tape. Such additional storage is illustrated in FIG. 1 by removable storage (108, 138, 158, and 178, respectively) and non-removable storage (110, 140, 160, and 180, respectively). Computer storage media includes volatile and nonvolatile, removable and non-removable media implemented in any method or technology for storage of information such as computer readable instructions, data structures, program modules or other data. Memory (104, 134, 154, and 174), removable storage (108, 138, 158, and 178), and non-removable storage (110, 140, 160, and 180) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100, 130, 150, and/or 170. Any such computer storage media may be part of device 100, 130, 150, and/or 170.

Computing devices 100, 130, 150, and/or 170 include one or more communication connections that allow computing devices 100, 130, 150, and/or 170 to communicate with each other and/or one or more other computing devices over network 116. Communications connection(s) 114, 144, 164, and 184 are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one implementation, computing device 100 is a client computer that communicates with server computer 130 using communication connection 114 and 144 over network 116, server computer 130 communicates with ecommerce back end server computing device 150 over network 116 using communication connections 144 and 164, and server computer 150 communicates with server computer 170 using communication connection 164 and 184 over network 116. In such an implementation, user interface 118 of client computing device 100 communicates with ecommerce site 148 on server computing device 130 to provide an online shopping experience to the user. Server computer 130 communicates with server computer 150 to access ecommerce site back end application 168, which handles the business logic and/or data access for the site. Server computer 150 communicates with server computer 170 to access the payment processor application 188, such as one operated by a third party payment provider.

In one implementation, user interface 118 of client computing device 100 is a browser-based user interface, server computing device 130 is a web server, and back end server computing device 150 hosts business logic and a data store for an ecommerce program. In another implementation, user interface 118 of client computing device 100 is a user interface included in an executable program located on client computing device 100. It will be appreciated that server computing device 130 and back end server computing device 150 can be the same computer in alternate implementations. Furthermore, it will be appreciated that additional back end server computing devices 150 could also be used, such as where multiple data stores are accessed by server computing device 130. Any one or more of the features implemented on computers 100, 130, 150, and/or 170 could be combined together on the same or different computers in alternate implementations.

Computing devices 100, 130, 150, and 170 may also have input device(s) (112, 142, 162, and 182, respectively) such as keyboard, mouse, pen, voice input device, touch input device, etc. Output device(s) (111, 141, 161, and 181, respectively) such as a display, speakers, printer, etc. may also be included. These devices are well known in the art and need not be discussed at length here.

Figure 2:
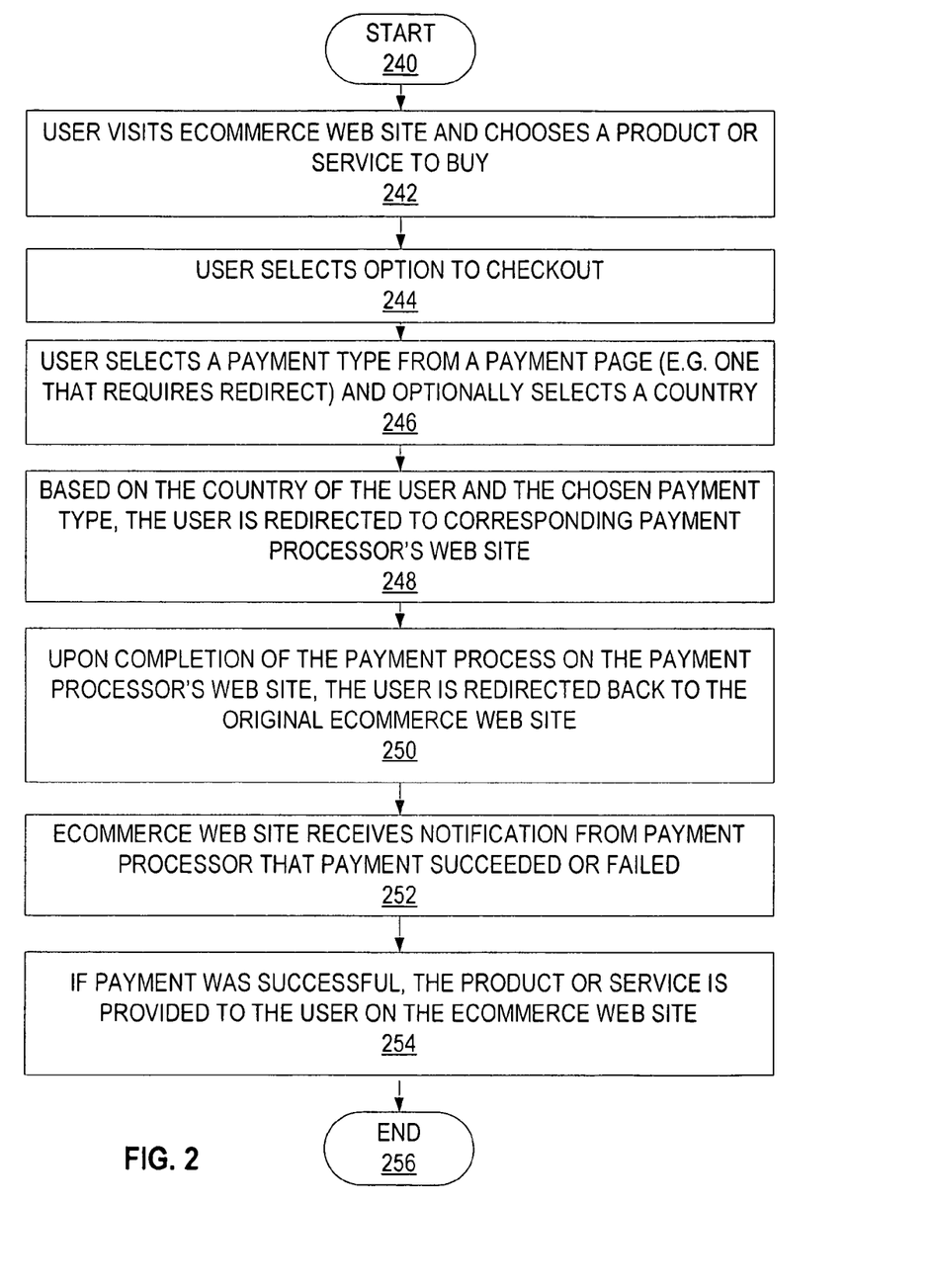
FIG. 2 is a high-level process flow diagram for one implementation of the system of FIG. 1.
Figure 3:
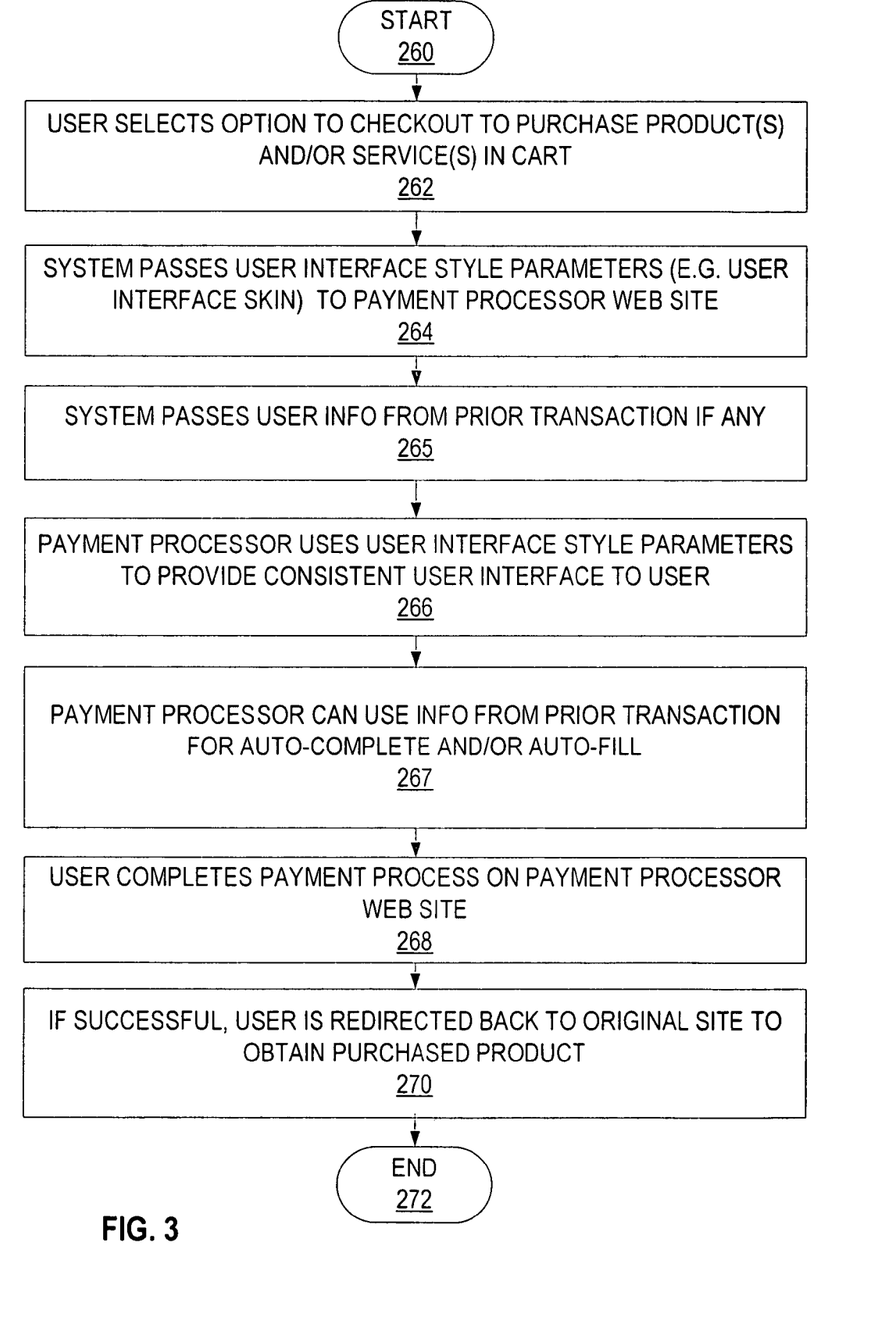
FIG. 3 is a process flow diagram for one implementation of the system of FIG. 1 illustrating the stages involved in providing an enhanced user interface during the payment process.

Turning now to FIGS. 2-7 with continued reference to FIGS. 1-2, the stages for implementing one or more implementations of user interface 118, ecommerce site 148, ecommerce site back-end 168, and/or payment processor application 188 are described in further detail. FIG. 2 is a high level process flow diagram for the ecommerce system. In one form, the process of FIG. 3 is at least partially implemented in the operating logic of computing devices 100, 130, 150, and/or 170.

The procedure begins at start point 240 with the user visiting ecommerce web site 148 and choosing one or more products and/or services to buy (stage 242). The user selects an option to checkout (stage 244). The user also selects a payment type from a payment page (e.g. one that requires redirecting to a payment processing site) and optionally selects a country, unless the country can programmatically be determined (stage 246). Based on the country of the user and the chosen payment type, the user is redirected to payment processor application 188 on a corresponding payment processor's web site (stage 248). Upon completion of the payment process on the payment processor's web site, the user is redirected back to the original ecommerce web site (stage 250). Ecommerce site 148 receives notification from payment processor application 188 that the payment succeeded or failed (stage 252). If payment was successful, then the product or service provisioning process resumes to provide the product or service to the user on the ecommerce web site 148 (stage 254). The process ends at point 256.

FIG. 3 illustrates one implementation of a process for providing an enhanced user interface during the payment process. In one form, the process of FIG. 3 is at least partially implemented in the operating logic of computing devices 100, 130, 150, and/or 170. The procedure begins at start point 260 with receiving a selection from a user of an option to checkout to purchase one or more products and/or services in the user's shopping cart (stage 262). The system passes one or more user interface style parameters, such as a theme or skin, to the payment processor's web site (stage 264). In one implementation, the system passes user information from a prior transaction, if any (stage 265). The payment processor uses the user interface style parameters to provide a consistent user interface to the user (stage 266). As one non-limiting example, the same theme that was displayed on the user's page on the ecommerce site 148 can also be displayed when the user is redirected to the payment processor application 188. This makes it appear to the user that it is one system. The payment processor can use the information from the prior transaction, if any, for an auto-complete and/or auto-fill feature (stage 267). For example, the user's personal information can already be filled in on the payment processing screen. This works even for scenarios where the user has never used that payment processor before because the ecommerce engine sends along the information. The user completes the payment process on the payment processor's web site (stage 268). If the payment process was successful, the user is redirected back to the original site to obtain the purchased product (stage 270). The process ends at end point 272.

Figure 4:
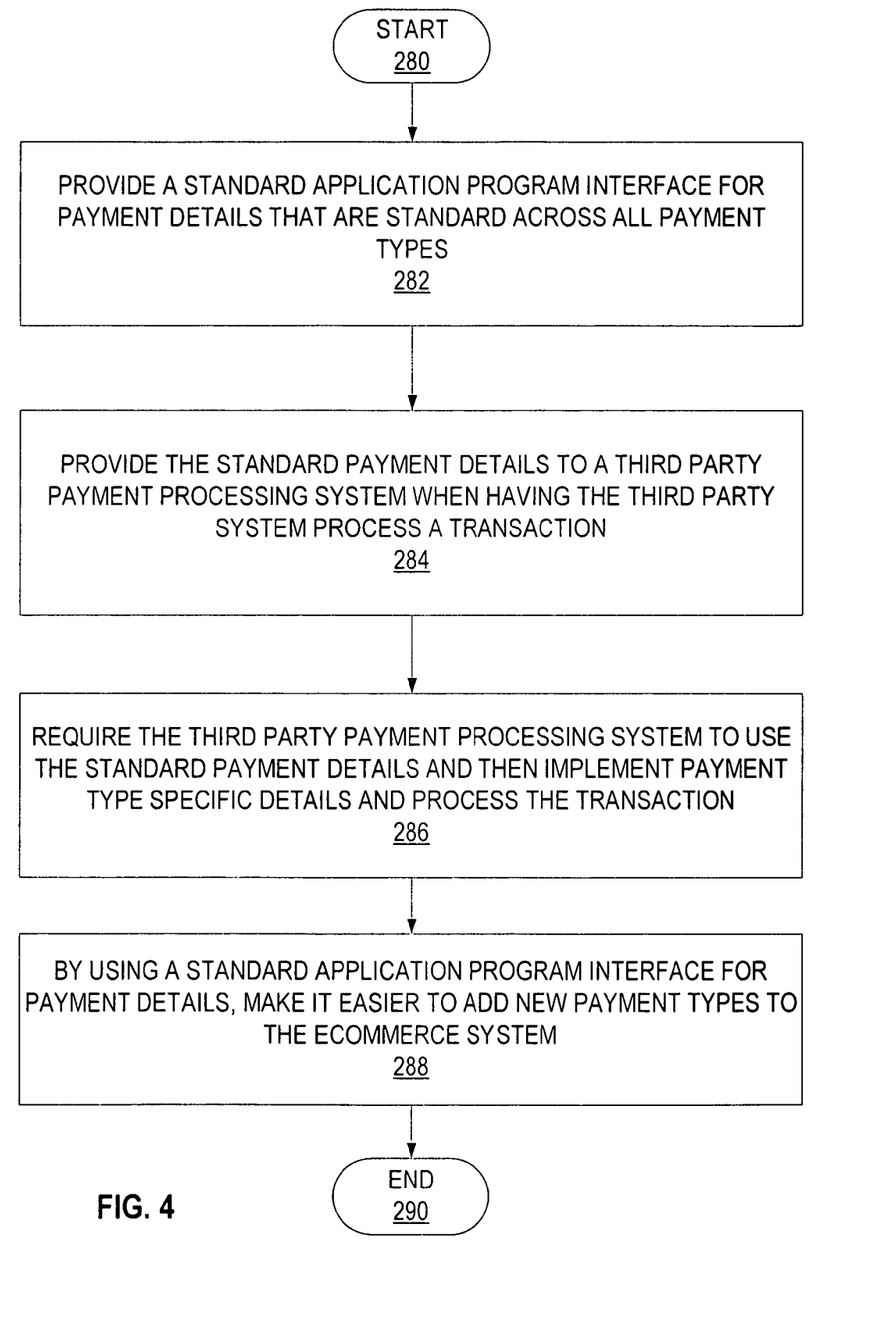

FIG. 4 illustrates the stages involved in providing a standardized application program interface that payment vendors comply with. In one form, the process of FIG. 4 is at least partially implemented in the operating logic of computing devices 100, 130, 150, and/or 170. The process begins at start point 280 with providing a standard application program interface for payment details that are standard across all payment types (stage 282). The standard payment details are provided to a third party payment processing system when the third party is responsible for processing the transaction (stage 284). The third party payment processing system is required to use the standard payment details, have a system that implements the payment type specific details, and then process the payment transaction for the user (stage 286). By using a standard application program interface for payment details, it is easier to add new payment types to ecommerce system 148 (stage 288). The process then ends at end point 290.

Figure 5:
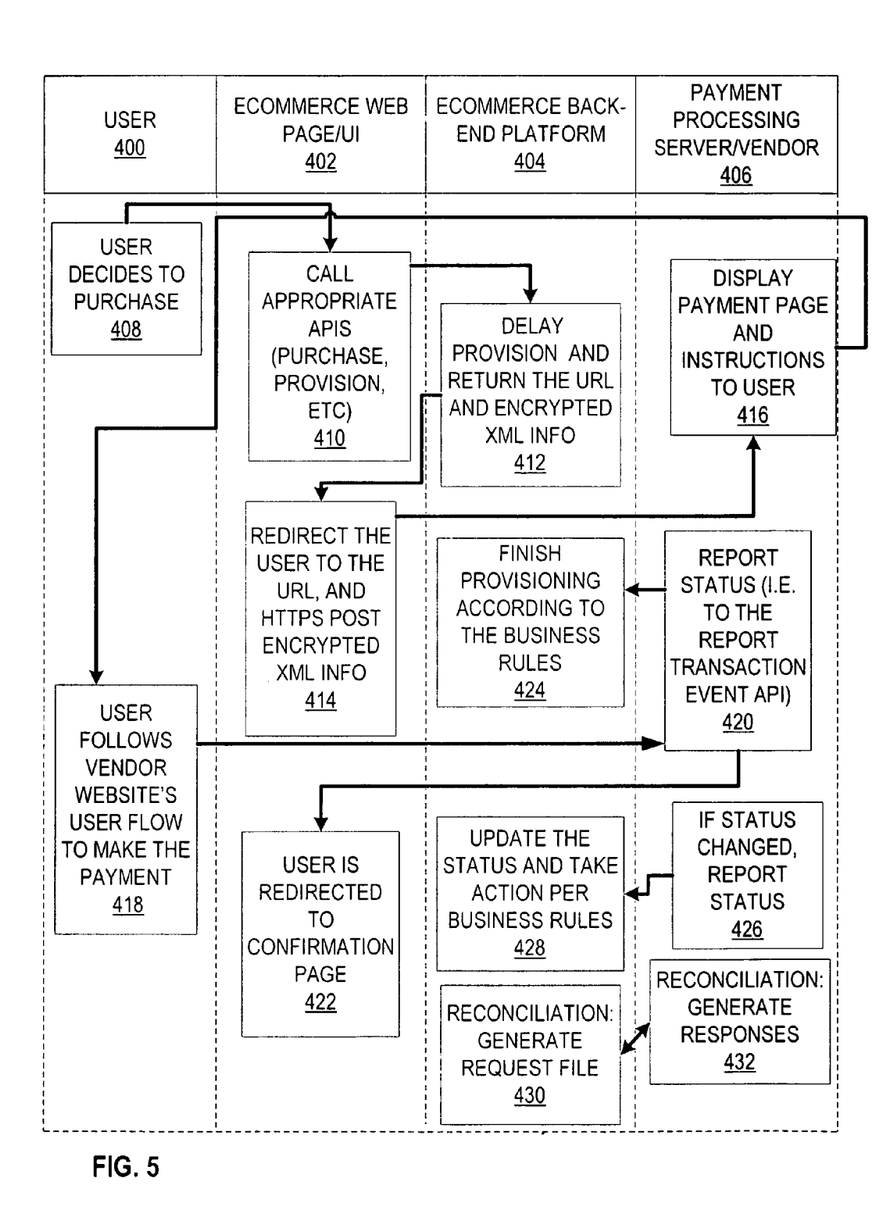
FIG. 5 is a process flow diagram for one implementation of the system of FIG. 1 illustrating the stages involved in processing a checkout transaction from start to finish across different systems.

FIG. 5 illustrates the stages involved in processing a checkout transaction from start to finish across different systems. In one form, the process of FIG. 5 is at least partially implemented in the operating logic of computing devices 100, 130, 150, and/or 170. The process begins with the user deciding to make a purchase from ecommerce site 148 (stage 408). Ecommerce site 148 calls the appropriate business logic APIs, such as purchase, provision, etc. (stage 410). The provisioning of the goods and/or services is delayed (i.e. the user doesn't get them until payment is confirmed) (stage 412). Also, the uniform resource locator (URL) for the payment processing provider and encrypted information (such as the transaction id and a transaction amount XML string) are returned from back-end computer 150 to ecommerce site 148 (stage 412). In one implementation, at least some of the information is encrypted in an extensible markup language (XML) format. The user is redirected to the URL of the payment processing provider, and the transaction information is posted securely, such as using HTTPS POST for the XML information (stage 414). The payment page and instructions are displayed to the user (stage 416) on user interface 118 from payment processor application 188.

The user follows user flow of the payment processing vendor's web site to complete the transaction (stage 418). A status is returned from the payment processor application (stage 420). In one implementation, the status is reported using the ReportTransactionEvent API, and includes one or more of the details included in the API, such as the transaction event details (TransactionEvent XML), the payment details (PaymentDetail XML), and so on. If the transaction was successful, the user is redirected to a confirmation page (stage 422) and is able to finish the provisioning of the goods and/or services according to the business rules (stage 424). If the status of the transaction changes (stage 426), it is reported by the payment processing application 188 to the ecommerce back end application 168, where action is taken per the business rules (stage 428). During a reconciliation process, a request file is generated by the back end application 168 (stage 430) and the payment processor application 188 returns the appropriate responses (stage 432). In one implementation, during the reconciliation process, the payment processing application 188 returns a log of transactions and events that occurred for the periods to be reconciled. Upon receiving the log, the back end application 168 verifies the log against its own internal records to check for inconsistencies. If any inconsistency is detected, an error record is created and sent back to the payment processing application 188 for further analysis.

Figure 6:
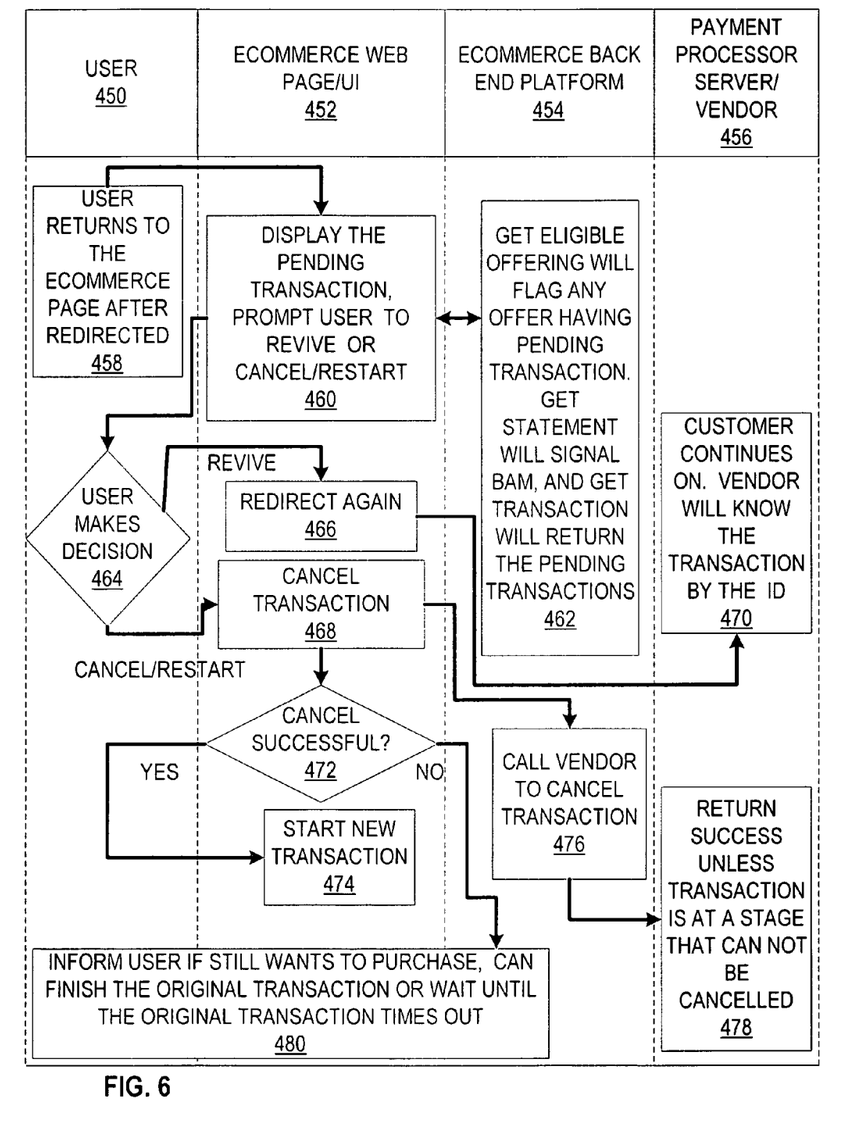
FIG. 6 is a process flow diagram for one implementation of the system of FIG. 1 that illustrates the stages involved in handling a resume/restart process for a transaction that did not complete the payment process.

FIG. 6 illustrates the stages involved in handling a resume/restart process for a payment transaction that did not finish successfully for some reason. In one form, the process of FIG. 6 is at least partially implemented in the operating logic of computing devices 100, 130, 150, and/or 170. The user returns to the ecommerce site 148 after being redirected (stage 458). The pending transaction is displayed to the user, and the user is prompted to select an option to either revive or cancel/restart the transaction (stage 460). A few non-limiting examples of the reasons the transaction did not finish successfully include there being an error in the payment processing application, the user closed the browser session before the transaction was completed, and/or various other scenarios.

The user makes a decision (decision point 464), and if the user selects an option to revive the prior transaction (stage 466), the user is again redirected to the vendor's payment processing application 188 (stage 470). The vendor's payment processing application will recognize the transaction by a transaction identifier or other unique identifier. If the user selects an option to cancel the prior transaction and restart a new transaction (stage 468), the system attempts to cancel the transaction with the vendor application (stage 476). The vendor processor application 188 returns a success for the cancellation unless the transaction is at a state that it cannot be cancelled (stage 478). If the cancel was successful (decision point 472), then a new transaction begins, and the user is prompted to start the process of purchasing the goods and/or services all over again (stage 474). If the cancel was not successful, then the user is informed that if they still want to make the purchase, they can finish the original transaction or wait until the original transaction times out (stage 480).

Figure 7:
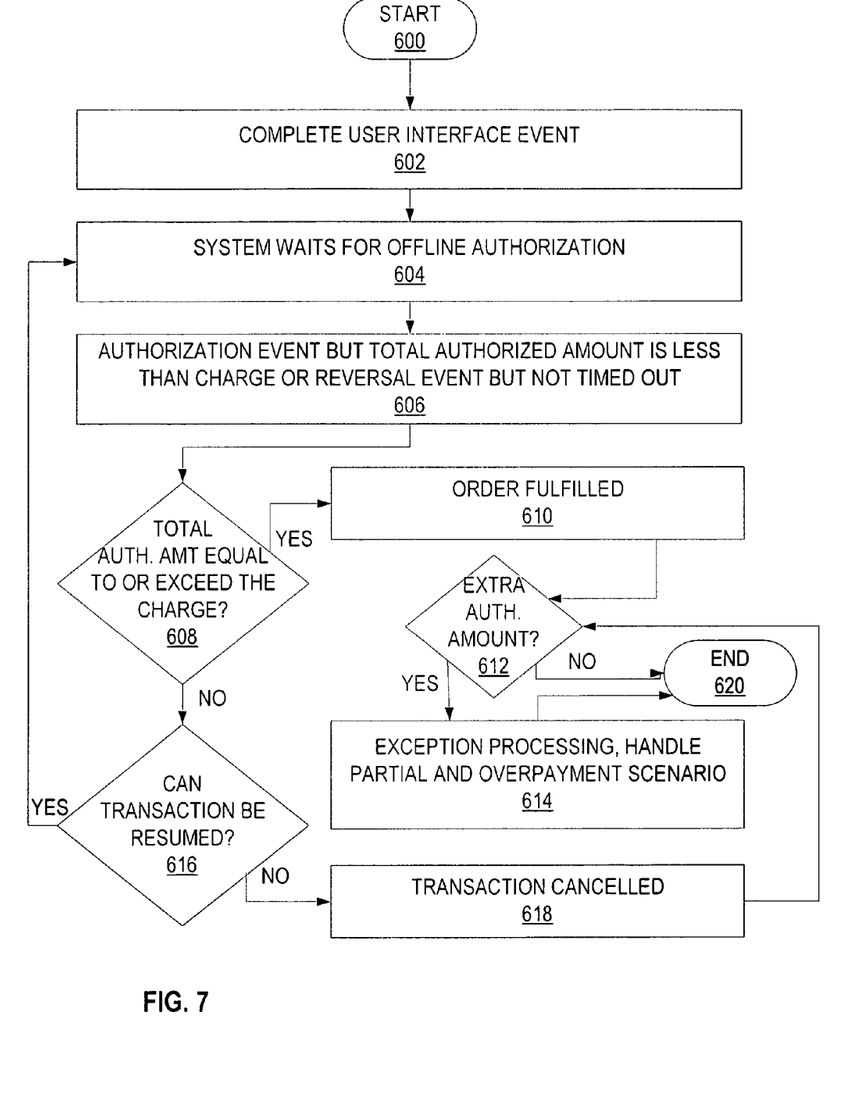
FIG. 7 is a process flow diagram for one implementation of the system of FIG. 1 that illustrates the stages involved in handling errors and overpayment scenarios that can occur during the payment process.

FIG. 7 illustrates the stages involved in handling errors and overpayment scenarios that occur during the payment process. In one form, the process of FIG. 7 is at least partially implemented in the operating logic of computing devices 100, 130, 150, and/or 170. The process begins at start point 600 with the user interface event being completed (stage 602). The system waits for offline authorization (stage 604). An authorization event occurs that has a total authorization amount that is less than the charge or a reversal event that has not timed out (stage 606). If the total authorization amount is equal to or exceeds the charge for the transaction (decision point 608), then the order is fulfilled (stage 610). If the total authorization amount does not equal or exceed the charge for the transaction (decision point 608), then the system checks to see if the transaction can be resumed (decision point 616). If the transaction can be resumed (decision point 616), then the system waits for offline authorization (stage 604). If the transaction cannot be resumed (decision point 616), then the transaction is cancelled (stage 618). In both scenarios (order fulfilled and transaction cancelled), if an extra authorized amount was specified (decision point 612), then exception processing kicks in to handle the partial and/or overpayment scenario (stage 614). The process then ends at end point 620.

Figure 8:
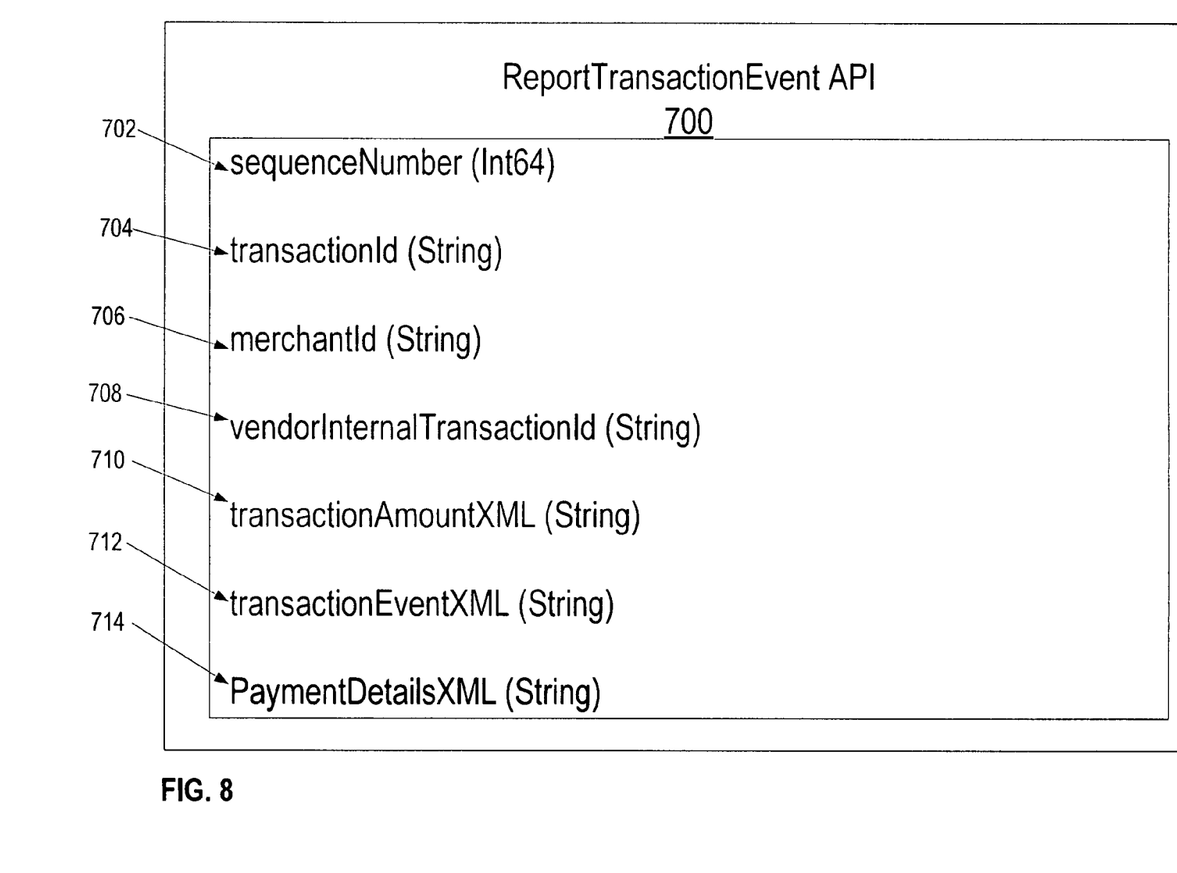
FIG. 8 is an object diagram for one implementation of the system of FIG. 1 that illustrates some procedures present in the ReportTransactionEvent of the standardized payment API.

Turning now to FIGS. 8-11, exemplary API's are described for one implementation of the system of FIG. 1. In one implementation, some or all of the parameters and/or tags described in FIGS. 8-11 are used in implementing the standard payment processing API for items that all payment types have in common. FIG. 8 is an object diagram for one implementation of the system of FIG. 1 that illustrates some procedures present in the ReportTransactionEvent API 700 of the standardized payment API. ReportTransactionEvent API 700 includes the following parameters:

- a sequenceNumber 702—an increasing number assigned to each unique transaction event report. For retries of the same call, the sequence number should be reused. Increasing number that is unique within the vendor.
- transactionId 704—the transaction ID for the transaction. This can be used to track transactions by both the ecommerce system provider and the payment processing vendor.
- merchantId 706—the unique ID of the merchant in the transaction. These IDs are provided to the payment vendor by a financial reporting process and allow financial reporting to allocate the revenue from the transaction appropriately.
- vendorInternalTransactionId 708—if the vendor can distinguish all unique transactions based on transaction ID, the vendor will have an internal transaction ID.
- transactionAmountXML 710—string containing details about the amount the customer is being charged (see the TransactionAmount XML Schema in FIG. 9 for more information).
- transactionEventXML 712—string returning the transaction event of the transaction (see the TransactionEvent XML Schema in FIG. 10 for more information).
- PaymentDetailsXML 714—string containing the payment details about the transaction, which is usually information regarding the payment type that was used (see the PaymentDetails XML Schema in FIG. 11 for more information).

Figure 9:
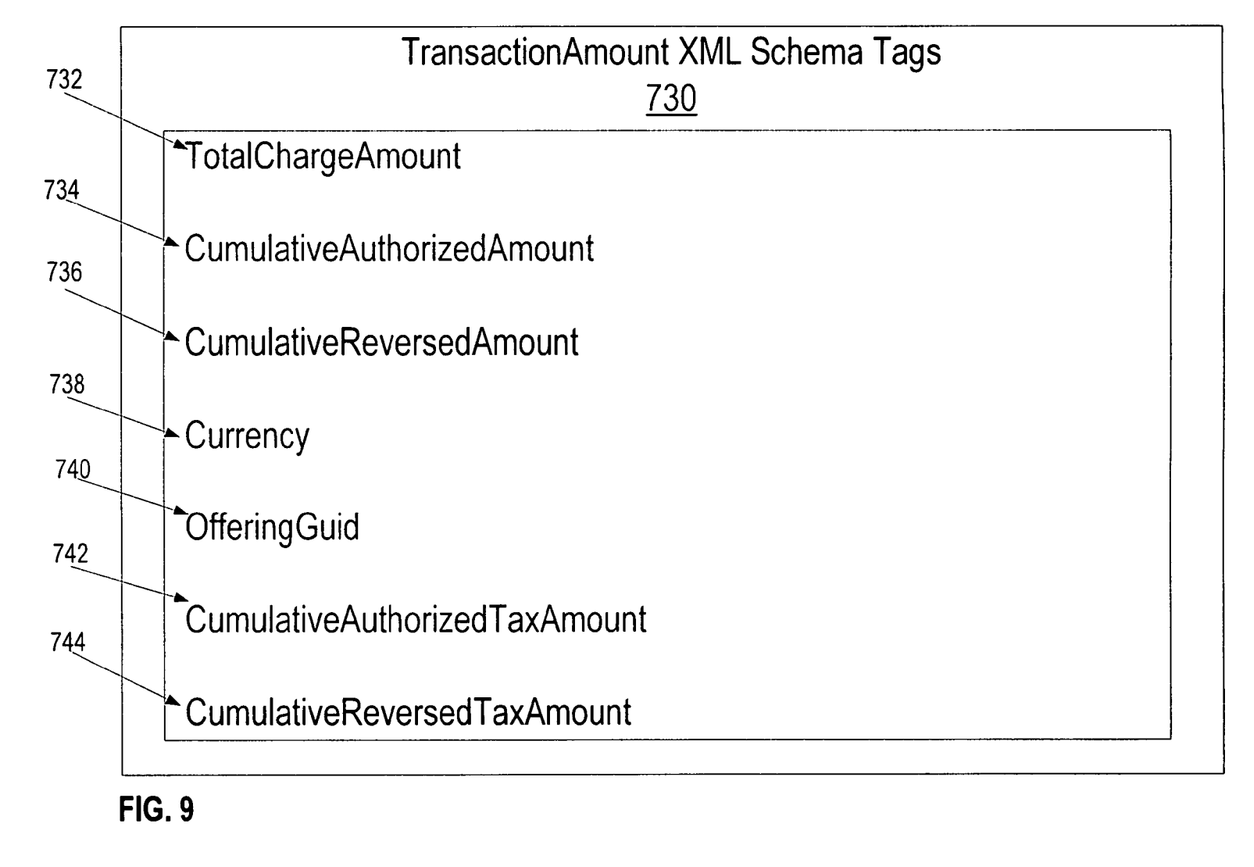
FIG. 9 is an object diagram for one implementation of the system of FIG. 1 that illustrates some of the tags present in the TransactionAmount XML Schema of the standardized payment API.

FIG. 9 illustrates some of the tags present in the TransactionAmount XML Schema 730 of the standardized payment API for one implementation of the system of FIG. 1. TransactionAmount XML Schema 730 includes the following tags:

- TotalChargeAmount 732—the total amount that was originally requested. Sent from ecommerce application to the payment vendor.
- CumulativeAuthorizedAmount 734—the total authorized amount so far, which can include the tax.
- CumulativeReversedAmount 736—the total reversed amount so far.
- Currency 738—a currency code, such as the ISO 3 character currency code.
- OfferingGuid 740—is an optional unique identifier to identify the offer (product and/or service). This is needed for some payment types that require offers to be set up ahead of time with each payment processing provider or network operator.
- CumulativeAuthorizedTaxAmount 742—in post tax countries, where tax is calculated by the payment processing vendor or agent of the vendor, this should be returned.
- CumulativeReversedTaxAmount 744—in post tax countries, where tax is calculated by the payment processing vendor or agent of the vendor, this should be returned.

Figure 10:
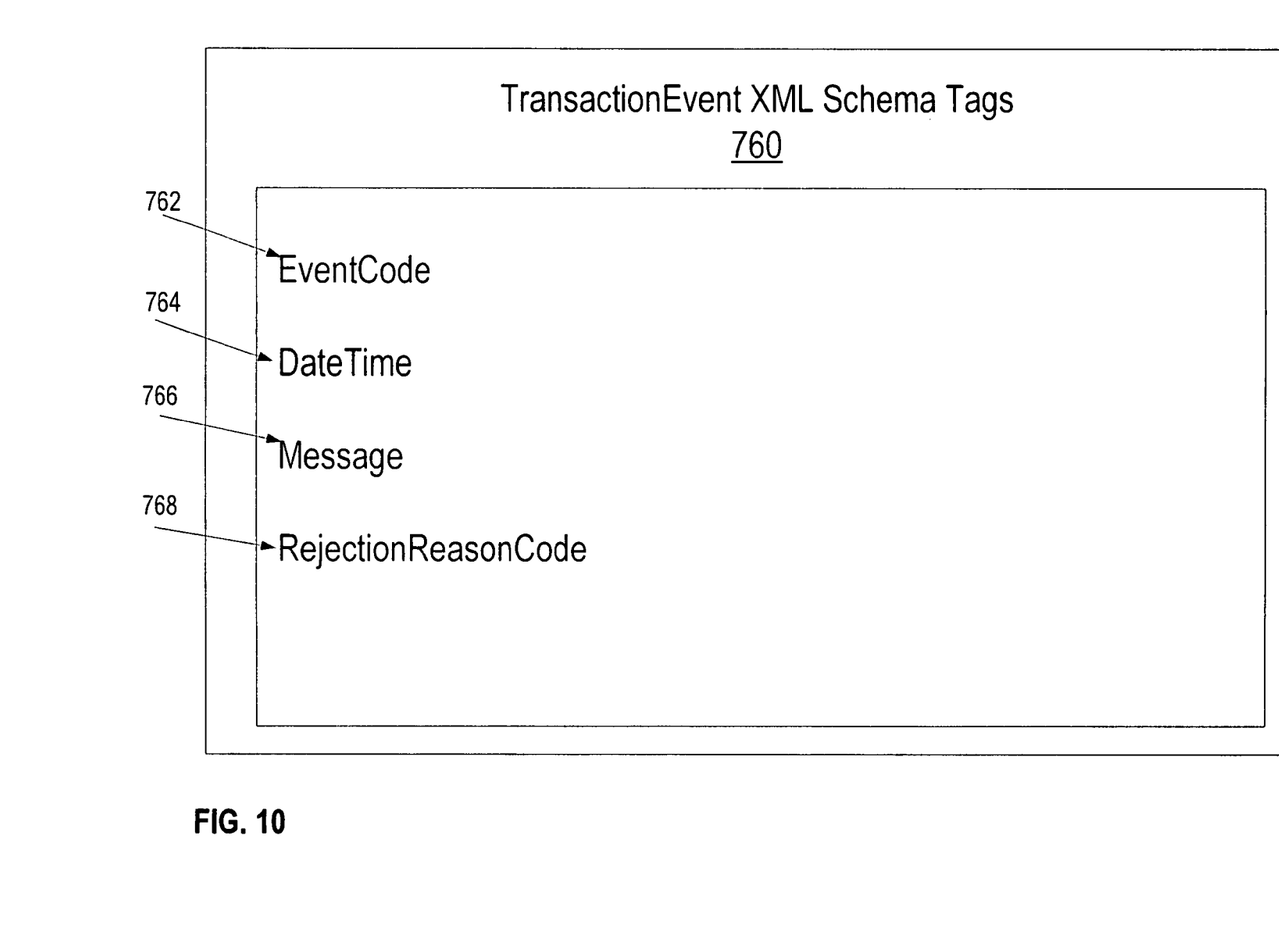
FIG. 10 is an object diagram for one implementation of the system of FIG. 1 that illustrates some of the tags present in the TransactionEvent XML Schema of the standardized payment API.

FIG. 10 illustrates some of the tags present in the TransactionEvent XML Schema 760 of the standardized payment API for one implementation of the system of FIG. 1. TransactionEvent XML Schema 760 includes the following tags:

- EventCode 762—value for the event taking place, such as CompletedUI, Authorization, Rejection, or Reversal.
- DateTime 764—the date and time where the status update changed.
- Message 766—any additional notes about the status update.
- RejectionReasonCode 768—reason code for the rejection, if applicable.

Figure 11:
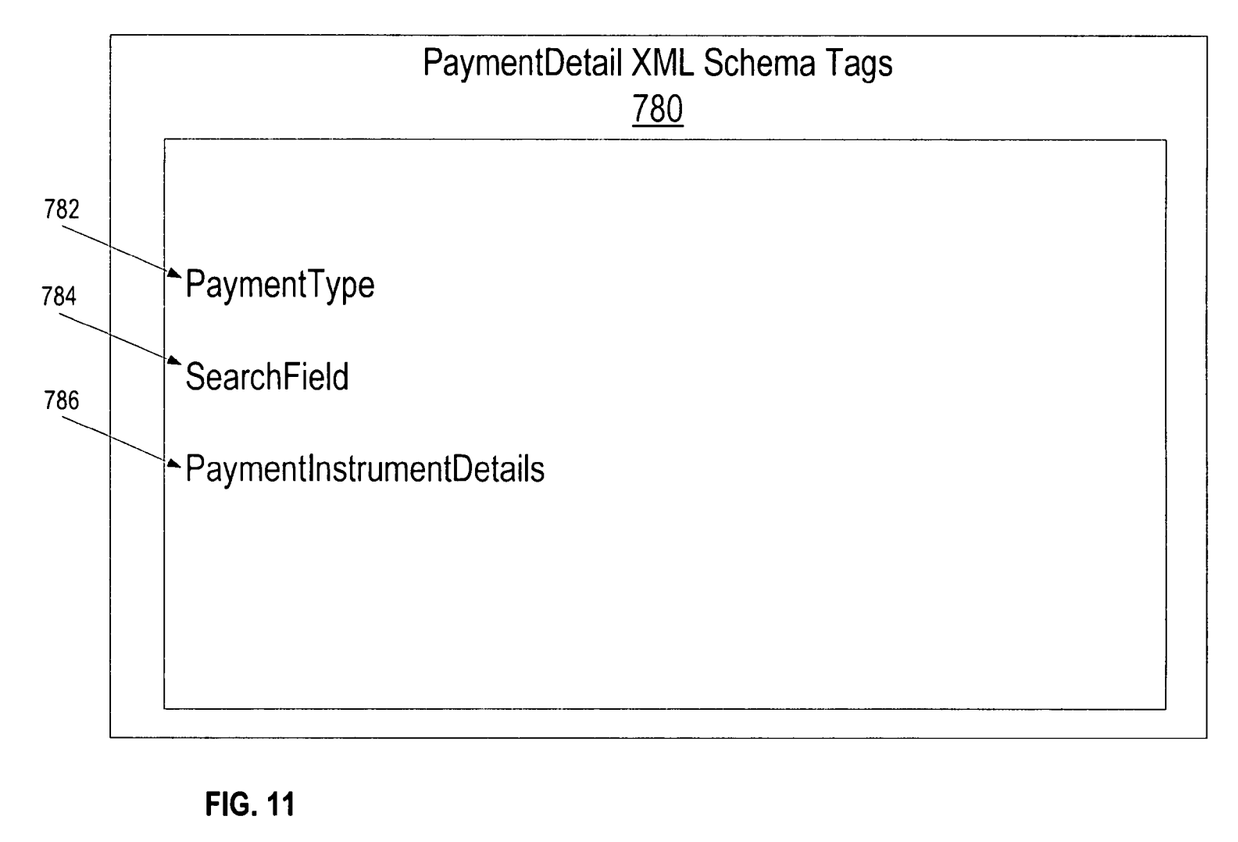
FIG. 11 is an object diagram for one implementation of the system of FIG. 1 that illustrates some of the tags present in the PaymentDetail XML Schema of the standardized payment API.

FIG. 11 illustrates some of the tags present in the PaymentDetail XML Schema 780 of the standardized payment API for one implementation of the system of FIG. 1. PaymentDetail XML Schema 780 includes the following tags:

- PaymentType 782—value for the payment type selected by the user, such as PremiumSMS (mobile phone charges), IVR (such as 900 numbers), etc.
- SearchField 784—This is a field for searching that can be different per payment type and decided per payment type. This field can be stored in an encrypted fashion.
- PaymentInstrumentDetails 786—free form of XML payment instrument that should be filled in with relevant information. Field not validated since free form XML.

Some, all, or additional parameters and/or tags than those contained in the APIs and XML Schemas described in the non-limiting examples of FIGS. 8-11 can be used for implementing one or more of the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for resuming an ecommerce purchase transaction that failed, the method comprising the steps of:
    displaying a pending purchase transaction that did not complete a prior payment process on one of a plurality of third party payment processing systems that was visited at an earlier time;
    prompting a user to select an operation selected from a group comprising a revival operation and a restart operation;
    if the user selects the revival operation, then redirecting the user back to the third party payment processing system to complete the prior payment process; and
    if the user selects the restart operation, then canceling the prior payment process and beginning a new payment process.

2. The method of claim 1, wherein the new payment process begins by redirecting the user to a second one of the plurality of third party payment processing systems that supports a selected payment type for a country of the user.

3. The method of claim 1, further comprising:
receiving, at an ecommerce system, a selection from the user indicating a desire to perform a checkout operation for one or more items in a shopping cart;
receiving, at the e-commerce system, a selection from the user of one of a plurality of payment types;
redirecting the user to the third party payment processing system, which supports the selected one of the plurality of payment types for a country of the user; and
providing, by the e-commerce system, a standard payment application program interface for interfacing with a plurality of third party payment processing systems, including the one of the plurality of third party payment processing systems.

4. The method of claim 3, further comprising:
passing at least one user interface style parameter from the ecommerce system to the one of the plurality of third party payment processing systems, the at least one user interface style parameter being for use in displaying a consistent user interface to the user.

5. The method of claim 3, further comprising:
receiving, by the ecommerce system, a notice from the one of the plurality of third party payment processing systems that a payment was successful; and
providing, by the e-commerce system, the one or more items to the user.

6. The method of claim 5, wherein the notice from the one of the plurality of third party payment processing systems includes a transaction event record that includes details regarding what the one of the plurality of third party payment processing systems did with order information related to the pending purchase transaction.

7. The method of claim 3, wherein:
the standard payment application program interface includes a set of standard payment processing details that the plurality of payment types have in common, and
each of the plurality of third party payment processing systems is configured to accept the set of standard payment processing details from the ecommerce system.

8. A computer-readable medium storing instructions executable by a computer for causing the computer to perform steps comprising:
displaying a pending purchase transaction that did not complete a prior payment process on one of a plurality of third party payment processing systems that was visited at an earlier time;
prompting a user to select an operation selected from a group comprising a revival operation and a restart operation;
if the user selects the revival operation, then redirecting the user back to the third party payment processing system to complete the prior payment process; and
if the user selects the restart operation, then canceling the prior payment process and beginning a new payment process.

9. The computer-readable medium of claim 8, wherein the stored instructions are further executable by the computer for causing the computer to perform steps comprising:
receiving, at an ecommerce system, a selection from the user indicating a desire to perform a checkout operation for one or more items in a shopping cart;
receiving, at the e-commerce system, a selection from the user of one of a plurality of payment types;
redirecting the user to the third party payment processing system, which supports the selected one of the plurality of payment types for a country of the user; and
providing, by the e-commerce system, a standard payment application program interface for interfacing with a plurality of third party payment processing systems, including the one of the plurality of third party payment processing systems.

10. The computer-readable medium of claim 9, wherein the stored instructions are further executable by the computer for causing the computer to perform a step comprising:
passing at least one user interface style parameter from the ecommerce system to the one of the plurality of third party payment processing systems, the at least one user interface style parameter being for use in displaying a consistent user interface to the user.

11. The computer-readable medium of claim 9, wherein the stored instructions are further executable by the computer for causing the computer to perform steps comprising:
receiving, by the ecommerce system, a notice from the one of the plurality of third party payment processing systems that a payment was successful; and
providing, by the e-commerce system, the one or more items to the user.

12. The computer-readable medium of claim 11, wherein the notice from the one of the plurality of third party payment processing systems includes a transaction event record that includes details regarding what the one of the plurality of third party payment processing systems did with order information related to the pending purchase transaction.

13. The computer-readable medium of claim 9, wherein:
the standard payment application program interface includes a set of standard payment processing details that the plurality of payment types have in common, and
each of the plurality of third party payment processing systems is configured to accept the set of standard payment processing details from the ecommerce system.

* * * * *